US008121574B2

(12) United States Patent
Zelder

(10) Patent No.: US 8,121,574 B2
(45) Date of Patent: Feb. 21, 2012

(54) LOOP-TYPE DIRECTIONAL COUPLER

(75) Inventor: Thomas Zelder, Luneburg (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 122 days.

(21) Appl. No.: 12/670,267

(22) PCT Filed: Jul. 17, 2008

(86) PCT No.: PCT/EP2008/005873
§ 371 (c)(1), (2), (4) Date: May 24, 2010

(87) PCT Pub. No.: WO2009/012937
PCT Pub. Date: Jan. 29, 2009

(65) Prior Publication Data

US 2010/0271150 A1 Oct. 28, 2010

(30) Foreign Application Priority Data

Jul. 24, 2007 (DE) ..................... 20 2007 010 239 U

(51) Int. Cl.
*H04B 1/18* (2006.01)
*H01Q 11/12* (2006.01)
*H01P 5/12* (2006.01)

(52) U.S. Cl. ........ 455/292; 455/269; 455/280; 343/741; 343/748; 343/788; 343/866; 333/109

(58) Field of Classification Search .................. 455/269, 455/280, 292; 343/741, 745, 748, 788, 797, 343/842, 866; 333/109, 113, 114
See application file for complete search history.

(56) References Cited

U.S. PATENT DOCUMENTS

| | | | | |
|---|---|---|---|---|
| 5,926,076 | A | 7/1999 | Johnson | |
| 6,590,541 | B1 * | 7/2003 | Schultze | 343/741 |
| 7,863,997 | B1 * | 1/2011 | Alton et al. | 333/113 |
| 7,969,372 | B2 * | 6/2011 | Miyashita et al. | 343/867 |

OTHER PUBLICATIONS

Lombardini, P.P., et al.; Criteria for the Design of Loop-Type Directional Couplers for the L Band: IRE Transactions on Microwave Theory and Techniques; Oct. 1956—pp. 234-239.

* cited by examiner

*Primary Examiner* — Quochien B Vuong
(74) *Attorney, Agent, or Firm* — DeLio & Peterson, LLC; Robert Curcio

(57) ABSTRACT

A loop directional coupler having a first waveguide, particularly a hollow, planar, or a coaxial conductor in the form of a half loop antenna having first and second antenna branches for the contact-free extraction of an incoming signal "a" on a second waveguide and a returning signal "b" on the second waveguide. The first antenna branch is connected to a first input of a first network and the second antenna branch is connected to a second input of the first network, the first network having a first power splitter at the first input and a second power splitter at the second input for dividing the signal present at each antenna branch, the first network having a first adder adding the signals of the first and second power splitters to each other, and a first subtractor subtracting the signals of the first and second power splitters from each other.

19 Claims, 4 Drawing Sheets

LOOP-TYPE DIRECTIONAL COUPLER

CROSS REFERENCE TO RELATED APPLICATION

This application is a National Phase filing under 35 U.S.C. §371 of PCT/EP/2008/005873 which was filed Jul. 17, 2008, and claims priority to German Application No. DE 20 2007 010 239.9 filed Jul. 24, 2007.

BACKGROUND OF THE INVENTION

1. Field of the Invention

The present invention relates to a loop-type directional coupler having a waveguide, and in particular a hollow waveguide, a planar waveguide or a co-axial waveguide, in the form of a half-loop antenna which has a first arm and a second arm, for the contactless coupling-out of a forward signal “a” on a waveguide and a backward signal “b” on said waveguide.

2. Description of Related Art

It is known for what are termed directional couplers to be used to determine and separate forward radio frequency current and voltage waves “a” and backward radio frequency current and voltage waves “b” on a guide or line and to determine the voltage “U” and current “I” on the guide or line. The directional coupler is one of the most widely used components in radio frequency and microwave circuits. It is a reciprocal four-port component in which, in the ideal case, two ports are decoupled from one another when all the ports have reflection-free terminations. For example, let it be assumed that port 1 is the input port to which a signal is fed. Let all the ports have reflection-free terminations. Port 4 for example is then the isolated port to which no part of the infed power is coupled. The other two ports are called the transmitted port and the coupled port.

An important variable for defining the quality of a directional coupler is its sharpness of directivity (directional coupling) or simply directivity. Sharpness of directivity is the ratio of the power at the coupled port to the power at the isolated port when all the ports have reflection-free terminations. According to K. W. Wagner, “Induktionswirkung von Wanderwellen in Nachbarleitungen” [Inductive effect of travelling waves on neighboring lines], Elektrotechnische Zeitschrift, Vol. 35, pages 639-643, 677-680, 705-708, 1914, the optimum directivity is obtained from a directional coupler comprising two coupled lines when the ratio of the inductive coupling factor to the capacitive coupling factor is equal to the product of the characteristic impedances of the individual lines.

Directional couplers are often used in measuring systems to allow the forward and backward waves to be determined separately. In circuitry technology, directional couplers are used as decoupled power dividers in attenuators, phase-shifters, mixers and amplifiers. The directional couplers are constructed in this case from for example co-axial waveguides, hollow waveguides and/or planar waveguides.

A possible coupling structure for separating the forward and backward waves is the loop-type directional coupler which is described by P. P. Lombardini, R. F. Schwartz, P. J. Kelly in “Criteria for the design of loop-type directional couplers for the L band”, IEEE Transactions on Microwave Theory and Techniques, Vol. 4, No. 4, pages 234-239, October 1956, and by B. Mäher in “An L-band loop-type coupler”, IEEE Transactions on Microwave Theory and Techniques, Vol. 9, No. 4, pages 362-363, July 1961. A loop-type directional coupler comprises a loop of guide which is positioned above or in a waveguide. Any desired waveguides, such as hollow guides, planar strip guides or co-axial guides may be used in this case. There are a wide variety of uses which can be made of a loop-type directional coupler. For example, F. De Groote, J. Verspecht, C. Tsironis, D. Barataud and J.-P. Teyssier, in “An improved coupling method for time domain load-pull measurements”, European Microwave Conference, Vol. 1, page 4 et seq., October 2005, and K. Yhland, J. Stenarson in “Noncontacting measurement of power in microstrip circuits” in 65th ARFTG, pages 201-205, June 2006, use a loop-type directional coupler as a component in a contactless measuring system.

Inductive and/or capacitive coupling structures are employed to determine the scattering parameters of a device under test (DUT) by using a contactless, generally vectorial, measuring system. The current and/or voltage on a signal line or guide which is directly connected to the device under test are determined by means of these coupling structures. Alternatively, the forward and backward waves on the signal line are measured, directional couplers then being used as coupling structures for separating the two waves.

The accuracy of an uncalibrated and a calibrated measuring system for determining the forward and backward waves by means of directional couplers depends on, amongst other things, the directivity of the couplers. When loop-type directional couplers are used in the way which is taken as an example, their directivity can be optimized by means of the positioning and angle of the loop relative to the signal line or guide and by varying the geometry of the loop. However, wide-band optimization of the directional coupling (over a plurality of octaves) is not possible by this means. The geometry of the configuration has to be re-optimized for each frequency range. A very accurate loop positioning unit is required for this purpose, and this causes a tremendous increase in the complexity of the directional coupler.

SUMMARY OF THE INVENTION

Bearing in mind the problems and deficiencies of the prior art, it is therefore an object of the present invention to simplify a loop-type directional coupler of the above kind as far as its use is concerned and at the same time to improve its directivity.

This object is achieved in accordance with the invention by a loop-type directional coupler of the above kind which has the features which are characterized in claim 1. Advantageous embodiments of the invention are described in the other claims.

Still other objects and advantages of the invention will in part be obvious and will in part be apparent from the specification.

The above and other objects, which will be apparent to those skilled in the art, are achieved in the present invention which is directed to a loop-type directional coupler comprising a hollow, planar, or co-axial waveguide in the form of a half-loop antenna including a first arm and a second arm, for contactless coupling-out of a forward signal “a” and a backward signal “b” on the waveguide, including having the first arm connected to a first input of a first network and the second arm connected to a second input of the first network, the first network having a first power divider at the first input and a second power divider at the second input, dividing the respective signals applied to the arms of the antenna, the first network including a first adder which adds together the signals from the first and second power dividers and feeds the signal Kc(a+b) resulting from the addition, where Kc is a capacitive coupling factor of the loop-type directional coupler, to a first output of the first network, and a first subtractor which subtracts the signals from the first and second power dividers from one another and feeds the signal Ki(a−b) resulting from the subtraction, where Ki is an inductive coupling factor of the loop-type directional coupler, to a second output of the first network, and including a third network having a first input connected to the first output of the first network and having a second input connected to the second output of the first network, the third network including a third power divider at the first input and a fourth power divider at the second input, dividing the respective signals applied to the inputs of the third network, the third network including a second adder receiving the resultant signal from the third power divider via a first capacitive signal path having a complex transmission factor D1 and the resultant signal from the fourth power divider via a first inductive signal path having a complex transmission factor D2 and which adds these signals together and feeds the signal resulting from the addition to a first output of the third network, the third network including a second subtractor receiving the signal from the third power divider via a second capacitive signal path having a complex transmission factor D3 and the signal from the fourth power divider via a second inductive signal path having a complex transmission factor D4 and which subtracts these signals from one another and feeds the signal resulting from the subtraction to a second output of the third network, there being arranged in at least one of the signal paths between the first and third networks or in at least one of the signal paths between the power dividers and the second adder and second subtractor, or both, at least one coupling-factor matcher which alters the magnitude or phase, or both magnitude and phase, of the signal on the given signal path in such a way that signals having coupling factors K1, K2 which are identical in respect of magnitude and phase are present for addition and subtraction at the second adder and second subtractor respectively.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
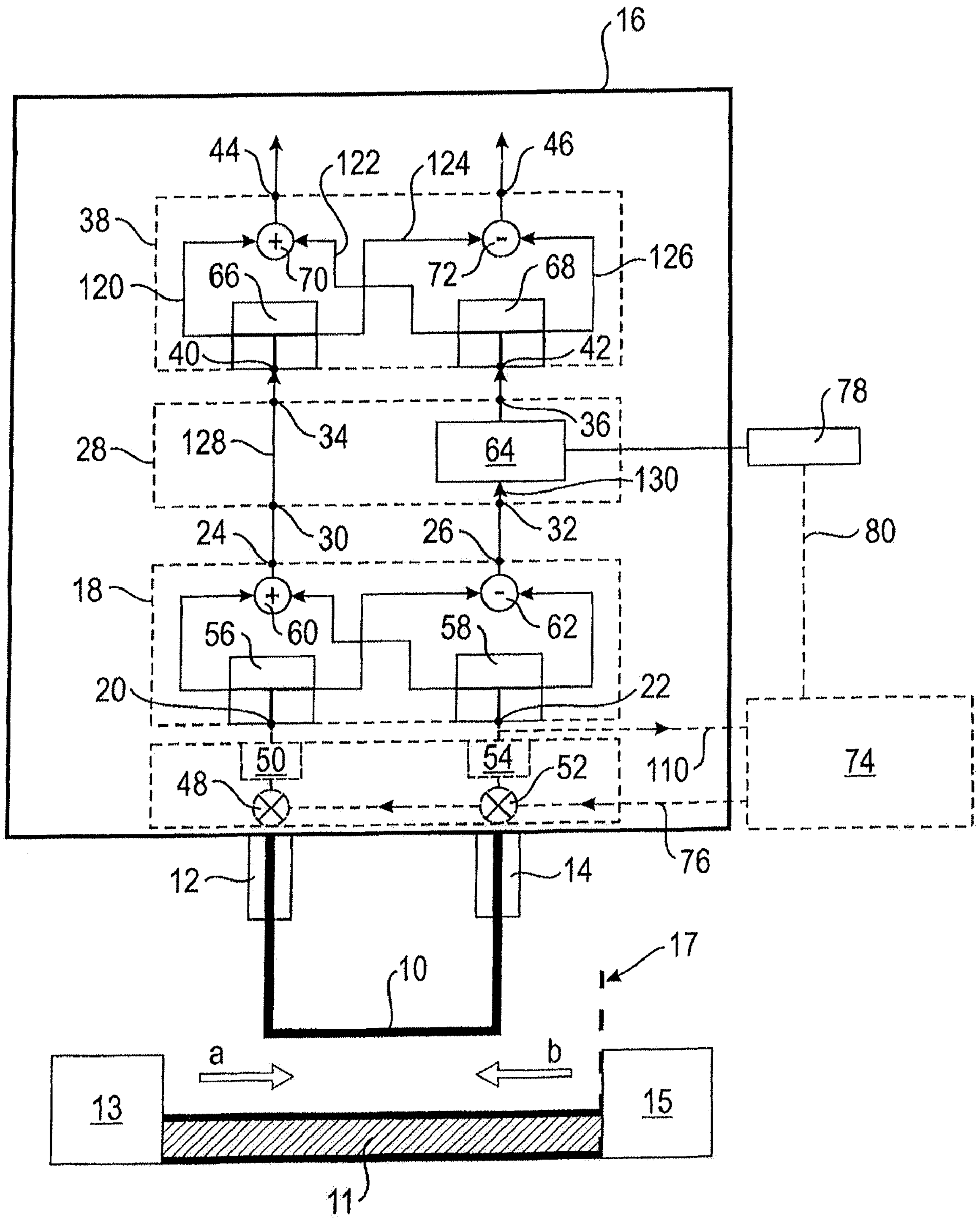
FIG. 1 is a schematic circuit diagram of a first preferred embodiment of loop-type directional coupler according to the invention.

In a loop-type directional coupler of the above kind, provision is made in accordance with the invention for the first arm of the antenna to be connected to a first input of a first network and for the second arm of the antenna to be connected to a second input of the first network, the first network having a first power divider at the first input and a second power divider at the second input, which power dividers divide the respective signals applied to the arms of the antenna, the first network having a first adder which adds together the signals from the first and second power dividers and feeds the signal $K_c(a+b)$ resulting from the addition, where $K_c$ is a capacitive coupling factor of the loop-type directional coupler, to a first output of the first network, and a first subtractor which subtracts the signals from the first and second power dividers from one another and feeds the signal $K_i(a-b)$ resulting from the subtraction, where $K_i$ is an inductive coupling factor of the loop-type directional coupler, to a second output of the first network, there being provided a third network having a first input which is connected to the first output of the first network and having a second input which is connected to the second output of the first network, the third network having a third power divider at the first input and a fourth power divider at the second input, which power dividers divide the respective signals applied to the inputs of the third network, the third network having a second adder which receives the signal from the third power divider via a first capacitive signal path having a complex transmission factor $D_1$ and the signal from the fourth power divider via a first inductive signal path having a complex transmission factor $D_2$ and which adds these signals together and feeds the signal resulting from the addition to a first output of the third network, the third network having a second subtractor which receives the signal from the third power divider via a second capacitive signal path having a complex transmission factor $D_3$ and the signal from the fourth power divider via a second inductive signal path having a complex transmission factor $D_4$ and which subtracts these signals from one another and feeds the signal resulting from the subtraction to a second output of the third network, there being arranged in at least one of the signal paths between the first and third networks and/or in at least one of the signal paths between the power dividers and the second adder and second subtractor at least one coupling-factor matching means or matcher which alters the magnitude and/or phase of the signal on the given signal path in such a way that signals having coupling factors $K_1$, $K_2$ which are identical in respect of magnitude and phase are present for addition and subtraction at the second adder and second subtractor respectively.

This has the advantage that a directional coupler becomes available whose coupling factors can be matched individually to frequency in such a way that the resulting capacitive and inductive coupling factors are almost identical even though the capacitive and inductive coupling factors which arise as a result of the geometrical form and configuration of the signal and of its frequency differ from one another. This brings about a corresponding improvement in directivity without the geometrical characteristics of the loop-type directional coupler having to be changed.

In a preferred embodiment, there is provided a second network having a first input which is connected to the first output of the first network, having a second input which is connected to the second output of the first network, having a first output which is connected to a first input of a third network, and having a second output which is connected to the second input of the third network, the second network having at least one coupling-factor matching means or matcher which alters the magnitude and/or phase of the signal at the first input of the second network and/or at the second input of the second network in such a way that signals having coupling factors $K_1$, $K_2$ which are identical in respect of magnitude and phase are present for addition and subtraction at the second adder and second subtractor respectively.

In this case, $K_1=K_2=K$ for example and the coupling-factor matching means or matcher is preferably so designed that it multiplies the signal at the first input of the second network by a first complex factor $F_1$ and/or the signal at the second input of the second network by a second complex factor $F_2$, the first and/or second complex factors $F_1$, $F_2$ being selected in such a way that that following is true:

$$K=K_c \cdot F_1 \cdot D_1=K_i \cdot F_2 \cdot D_2=K_c \cdot F_1 \cdot D_3=K_i \cdot F_2 \cdot D_4$$

or $$K=K_c \cdot F_1 \cdot D_1=K_i \cdot D_2=K_c \cdot F_1 \cdot D_3=K_i \cdot D_4$$

or $$K=K_c \cdot D_1=K_i \cdot F_2 \cdot D_2=K_c \cdot D_3=K_i \cdot F_2 \cdot D_4$$

To allow the complex factors required for matching the capacitive and inductive coupling factors to be adjusted or determined, provision is made in a preferred embodiment for a first changeover switch to be so arranged between the first output of the second network and the first input of the third network and to be so formed, and for a second changeover switch to be so arranged between the second output of the second network and the second input of the third network and to be so formed, that, as desired, these changeover switches either apply the signals coming from the first and second outputs of the second network to the first and second inputs respectively of the third network or transmit said signals onwards while bypassing the third network.

In an alternative embodiment, there is arranged between the first output of the second network and the first input of the third network a fifth power divider which applies the signal coming from the first output of the second network to the first input of the third network and to a third changeover switch, and there is arranged between the second output of the second network and the second input of the third network a sixth power divider which applies the signal coming from the second output of the second network to the second input of the third network and to a fourth changeover switch, the changeover switches begin so arranged and formed that they feed the signals coming from the power dividers either to a receiver or to a terminating resistor, as desired.

In a further alternative embodiment, a coupling-factor matching means or matcher is arranged in each of the first and second capacitive signal paths and/or first and second inductive signal paths of the third network, the coupling-factor matching means or matcher in the first capacitive signal path multiplying the signal by a complex factor $F_3$, the coupling-factor matching means or matcher in the first inductive signal path multiplying the signal by a complex factor $F_4$, the coupling-factor matching means or matcher in the second capacitive signal path multiplying the signal by a complex factor $F_5$, and the coupling-factor matching means or matcher in the second inductive signal path multiplying the signal by a complex factor $F_6$, the complex factors $F_3$, $F_4$, $F_5$ and $F_6$ being selected in such a way that the following are true:

$$K_c*D_1*F_3=K_i*F_4*D_2=K_1$$

and $$K_c*D_3*F_5=K_i*F_6*D_4=K_2$$

when a coupling-factor matcher is arranged in all the signal paths of the third network, or $$K_c*D_1=K_i*F_4*D_2=K_1$$

$$K_c*D_3=K_i*F_6*D_4=K_2$$

when a coupling-factor matcher is arranged only in each of the first and second inductive signal paths of the third network, or $$K_c*D_1*F_3=K_i*D_2=K_1$$

$$K_c*D_3*F_5=K_i*D_4=K_2$$

when a coupling-factor matcher is arranged only in each of the first and second capacitive signal paths of the third network, or $$K_c*D_i*F_3=K_i*F_4*D_2=K_1$$

and $$K_c*D_3*F_5=K_i*D_4=K_2$$

when a coupling-factor matcher is arranged in each of the first and second capacitive signal paths (120, 124) of the third network (38) and in the first inductive signal path (122) thereof, or $$K_c*D_1*F_3=K_i*F_4*D_2=K_1$$

and $$K_c*D_3=K_i*F_6*D_4=K_2$$

when a coupling-factor matcher is arranged in each of the first and second capacitive signal paths (120, 124) of the third network (38) and in the second inductive signal path (126) thereof, or $$K_c*D_1=K_i*F_4*D_2=K_1$$

and $$K_c*D_3*F_5=K_i*F_6*D_4=K_2$$

when a coupling-factor matcher (112, 114) is arranged in each of the first and second inductive signal paths (122, 126) of the third network (38) and in the second capacitive signal path (124) thereof, or $$K_c*D_1*F_3=K_i*F_4*D_2=K_1$$

and $$K_c*D_3=K_i*F_6*D_4=K_2$$

when a coupling-factor matcher (112, 114) is arranged in each of the first and second inductive signal paths (122, 126) of the third network (38) and in the first capacitive signal path (120) thereof.

It is possible for the power dividers, adders, subtractors and coupling-factor matcher to be optimized for a predetermined intermediate frequency, and for costs to be reduced accordingly, by arranging respective mixers and filters between the first arm of the antenna and the first input of the first network and between the second arm of the antenna and the second input of the first network, the mixers and filters being so designed that they convert the signals coming from the arms of the antenna to a predetermined intermediate frequency. For this purpose, the mixers are connected to a variable frequency oscillator (VFO) which feeds a mixer signal for mixing with the signals coming from the arms of the antenna to the mixers. The VFO preferably takes the form of a phase-locked loop having a local oscillator and/or a reference oscillator.

Individual complex factors for each operating frequency at which there is improved matching of the coupling factors are obtained by connecting the VFO to a control system for controlling the coupling-factor matcher, the control system for controlling the coupling-factor matcher setting a complex factor F, or complex factors $F_1$, $F_2$, $F_3$, $F_4$, $F_5$ and/or $F_6$, as the case may be, as a function of the mixer frequency fed to the mixers.

To allow the loop-type directional coupler to be configured automatically, the receiver is connected to the control system for controlling the coupling-factor matcher, the receiver preferably being so designed that it controls the control system for controlling the coupling-factor matcher in such a way that said control system for controlling the coupling-factor matcher feeds to the coupling-factor matcher parameters such that the coupling-factor matcher alters the magnitude and/or phase of the signal at the first input of the second network and/or at the second input of the second network in such a way that an identical coupling factor K exists at both the outputs of the second network.

Alternatively, the receiver may be so designed that it controls the control system for controlling the coupling-factor matcher in such a way that said control system for controlling the coupling-factor matcher feeds to the coupling-factor matcher parameters such that the coupling-factor matcher alters the magnitude and/or phase of the signal at the first input of the second network and/or at the second input of the second network in such a way that a first coupling factor $K_1$ exists at inputs of the second adder and a second coupling factor $K_2$ exists at the inputs of the second subtractor.

To enable the coupling-factor matcher to be controlled, or in other words to enable the coupling factors $F_3$ to $F_6$ to be set, when the waveguide is terminated by a reflection-free or low reflection resistor, a switch or a power divider which is connected to a vectorial receiver is provided between at least one coupling-factor matcher and the second adder or second subtractor, as the case may be, or upstream of at least one of the inputs of the second adder and the second subtractor.

The first preferred embodiment of loop-type directional coupler according to the invention which is shown in FIG. 1 is intended for coupling out a forward wave “a” which is travelling along a waveguide 11 between a signal source 13 and a device under test (DUT) 15 and a backward wave “b” which is reflected there along and it comprises a half-loop antenna 10 having a first arm 12 and a second arm 14. Reference numeral 17 identifies a reference plane. The two arms 12, 14 of the antenna are connected to a configurable network 16.

Arranged in the configurable network 16 are a first network 18 having a first input 20, a second input 22, a first output 24 and a second output 26, a second network 28 having a first input 30, a second input 32, a first output 34 and a second output 36, and a third network 38 having a first input 40, a second input 42, a first output 44 and a second output 46. The second network 28 forms signal paths 128 and 130 between the outputs 24, 26 of the first network 18 and the inputs 40, 42 of the third network.

The first arm 12 of the antenna is connected to the first input 20 of the first network 18 via a first mixer 48 and a first filter 50. The second arm 14 of the antenna is connected to the second input 22 of the first network 18 via a second mixer 52 and a second filter 54.

The first network 18 has a first power divider 56 at the first input 20 and a second power divider 58 at the second input 22. Also arranged in the first network 18 are a first adder 60 which adds together the signals from the first power divider 56 and second power divider 58 and feeds them to the first output 24 of the first network 18, and a first subtractor 62 which subtracts the signals from the first power divider 56 and second power divider 58 from one another and feeds them to the second output 26 of the first network 18. What is obtained in this way at the first output 24 of the first network 18 is a signal $K_c$*(a+b), where $K_c$ is the capacitive coupling factor of the loop-type directional coupler, and what is obtained in this way at the second output 26 of the first network 18 is a signal $K_i$*(a−b), where $K_i$ is the inductive coupling factor of the loop-type directional coupler. $K_c$ is not equal to $K_i$ in this case.

In the second network 28, the signal $K_i$*(a−b) is multiplied, by a coupling-factor matching means or matcher 64, by a complex factor F which alters the magnitude and phase of said signal $K_i$*(a−b). The complex factor F is selected in such a way in this case that $K_c$=$K_i$*F=K. The signal $K_i$*F*(a−b) resulting from the multiplication is fed to the second output 36 of the second network 28 by the coupling-factor matching means 64. The signal $K_c$*(a+b) is passed through by the second network 28 to the second output 34 of the second network 28. It should be stressed that this matching of the magnitude and phase of both the coupling factors $K_i$ and $K_c$ is merely given by way of example. As an alternative, it is also possible for only the other signal $K_c$*(a+b) to be multiplied by a complex factor F, so that what is true is that $K_c$*F=$K_i$=K, or for the two signals $K_i$*F(a−b) and $K_c$*(a+b) to be multiplied by respective coupling factors $F_1$, $F_2$ to give $F_1$*$K_c$*(a+b) and $F_2$*$K_i$*(a−b) so that what is true is that K=$F_1$*$K_c$=$F_2$*$K_i$. What is essential is that the signal K*(a+b) is always applied to the first input 40 of the third network 38 and the signal K*(a−b) is always applied to the second input 42 of the third network 38, i.e. that there are identical coupling factors.

The third network 38 has a third power divider 66 at the first input 40 and a fourth power divider 68 at the second input 42. Also arranged in the third network 38 are a second adder 70 which adds together the signals from the third power divider 66 and fourth power divider 68 and feeds them to the first output 44 of the third network 38, and a second subtractor 72 which subtracts the signals from the third power divider 66 and fourth power divider 68 from one another and feeds them to the second output 46 of the first network 38. What is obtained in this way at the first output 44 of the third network 38 is a signal $2K_1$*a, and what is obtained in this way at the second output 46 of the third network 38 is a signal $2K_2$*b, where $K_1$ is the coupling factor at the two inputs of the second adder 70 and $K_2$ is the coupling factor at the two inputs of the second subtractor 72. The resulting coupling factors for the forward wave “a” and the backward wave “b” are thus identical, namely K, in this case. The third network 38 has a first capacitive signal path 120 extending from the third power divider 66 to the second adder 70, a first inductive signal path 122 extending from the third power divider 66 to the second subtractor 72, a second capacitive signal path 124 extending from the fourth power divider 68 to the second adder 70, and a second inductive signal path 126 extending from the fourth power divider 68 to the second subtractor 72.

The mixers 48, 52 and filters 50, 54 are used to convert the signals coming from the arms 12 and 14 of the antenna to a predetermined intermediate frequency, which means that the downstream components only have to be optimized for said predetermined intermediate frequency. Provided for this purpose is a variable frequency oscillator (VFO) or phase-locked loop (74) having a local oscillator or a reference oscillator, which feeds to the mixers 48 and 52 an appropriate reference signal or signal for mixing 76 which the mixers 48 and 52 mix with the respective output signals from the two arms 12, 14 of the antenna. The phase-locked loop 74 is also connected to a control system 78 for controlling the coupling-factor matching means 64 and transmits to the latter the current frequency 80 of the reference signal 76. As a function of this frequency 80, the control system 78 selects a complex factor F, or complex factors $F_1$, $F_2$, as the case may be, individual to the frequency and transmits it or them to the second network 28 or rather to the coupling-factor matching means 64 in the second network 28. An intermediate frequency signal 110 is transmitted to the phase-locked loop 74 to control the VFO. This intermediate frequency signal 110 is picked off upstream of either the first input 20 of the network 18 or its second input 22.

Because of the use of the configurable electrical four-port network 16 which is connected on the one hand to the isolated port of the loop antenna 10, which loop antenna 10 acts as a backward wave coupler, and on the other hand to its coupled port, the directivity of the directional coupler according to the invention can be optimized for each frequency without any change in its position or geometry. When the loop antenna 10 is used together with the network 16 it is possible, when using in addition a signal guide or line of any desired type such for example as a co-axial guide or a microstrip guide, for an optimized loop-type directional coupler to be produced without any change to the geometry of the loop or to its arrangement relative to the signal guide or line 11.

The configurable network 16 comprises the three sub-networks 18, 28 and 38, in which case the first network 18 and the third network 38 may be identical. It is not essential for the mixers 48, 52 and filters 50, 54 to be incorporated but this does give certain advantages.

The operation of the network 16 will be explained in what follows by reference to FIG. 1. The half-loop 10 of guide or line couples out some of the energy which is present in for example the near field of the signal guide or line 11 inductively and capacitively. Where there is a loop 10 of guide or line which is small in comparison with the wavelength of the electrical signal, the currents which are induced inductively and capacitively in the first arm 12 of the antenna add together, the currents subtracting from one another in the other, second arm 14 of the antenna due to a phase difference of 180°.

It will first be assumed that the mixers 48, 52 and filters 50, 54 are not part of the network 16. The inductively and capacitively coupled signals on the arms 12, 14 of the antenna are then separated by means of the first network 18, and what are thus present at the end of the first network 18 are on the one hand only the inductive signal which corresponds to the current on the signal guide or line 11 and on the other hand the capacitive signal which corresponds to the voltage on the signal guide or line 11. The first network 18 comprises the two power dividers 56, 58, which are two 3 dB couplers for example, and, for each of them, an adding network 60 and subtracting network 62. What is provided as an adding network 60 is for example a "rotated" 3 dB coupler (combiner) and what is provided as a subtracting network 62 is for example a balancing member (balun).

In the second network 28, the coupling factors are matched by multiplying the signal on one path by the complex factor F, which means that $K=F*K_i=K_c$ is true. This gives optimum directivity. The alteration in the magnitude and phase of the signal is made for example by means of an amplifier or an attenuator in combination with a phase shifter. It is preferable in this case for use to be made of electronically controllable components, thus enabling the complex factor F to be adjusted quickly and easily by means of electrical control signals when there is a change in the measuring configuration. The positioning of the multiplying unit, i.e. of the coupling-factor matching means 64, may be as desired in this case. As shown in FIG. 1, it is possible for the multiplication to be carried out on only one path, it being immaterial which of the two paths available is used. As well as this, it is also possible for the controllable components to be provided in both paths or for only the phase to be controlled on one path and only the magnitude on the other path. In this way, not only the directivity but also the coupling attenuation can be set by means of the second network 28 without the intrinsic directivity or intrinsic coupling attenuation of the single loop 10 of guide or line having to be changed.

If the two coupling factors Ki and Kc are converted into K in an identical way, the signals are combined again by the third network 38, thus producing only the forward wave a as a function of the coupling factor K at one output 44 and only the backward wave b at the other output 46. To ensure that this is what happens, the individual paths of the network are absolutely identical in design and construction.

One problem which exists when it comes to practical implementation is that the components required, such for example as the subtractors 62, 72 (baluns) and the power dividers 56, 58, 66, 68 operate at only limited frequencies. This militates against wide-band use of the system. As a remedy, the system may optionally be expanded by one or more heterodyne mixing stages which contain the mixers 48, 52 and filters 50, 54. The signals from the loop 10 are mixed in this case with the reference signal 76 to give a low, fixed (predetermined) intermediate frequency. By the use of a fixed intermediate frequency, it becomes possible for the configurable network 16 to be integrated as a circuit because the requirements relating to width of frequency band which the individual components have to meet become appreciably less stringent. What is more, the system can be optimized for signals of any desired bandwidth. The reference signal required 76 is for example generated by means of a locking loop and a local and reference oscillator 74.

The network 16 can clearly be considered to constitute a hardware means of calibrating the loop 10 with the aim of increasing directivity.

In what follows the control and calibration of the network 16 will be described. Configuring of the network 16 is tantamount to the control of the second network 28. The object is first to determine the complex factor F and then to drive the components of the second network 28 in such a way that they conform to the factor F. To enable the correct factor F to be set, what is connected to the reference plane 17 as a DUT (device under test) is a low-reflection termination and ideally one which is free of reflection. In the ideal case, all that then exists on the signal line 11 is the forward wave "a". This results in the forward wave "a" being able to be measured at the two outputs 24, 26 of the first network 18 on the one hand as multiplied by the capacitive coupling factor $K_c$*a and on other hand as multiplied by the inductive coupling factor $K_i$*a. The parameters (magnitude and phase) of the second network 28 are then set in such a way that the two output signals from the second network 28 are equal in magnitude and phase at the outputs 34, 36 of the latter, which means that $K_c=F*K_i=K$ is true. For the outputs signals from the second network 28 to be measured, the connection between the second network 28 and the third network 38 has to be disconnected so that the second network 28 can be connected directly to vectorial receivers. Because there is not in fact any such thing as a reflection-free termination, a low-reflection termination has to be used to set the factor F. The lower the reflection of the termination, the higher are the values of directivity which can be achieved with the arrangement as a whole. What is more, the level of the directivity depends on whether the transmission functions of the paths in the third network 38 are the same. The greater the difference between the transmission functions, the lower are the values of directivity which can be achieved. For very high values of directivity to be achieved, coupling-factor matching means are arranged immediately downstream of the adder 70 and subtractor 72, as will subsequently be explained in detail by reference to FIG. 4, with the aim of matching the coupling factors to give $K_c=F*K_i=K$, or else the transmission functions ($D_{cM}$, $D_{cP}$, $D_{iM}$, $D_{iP}$) of the paths in the third network 38 are known in respect of magnitude and phase, from a measurement process for example, and are stored in a memory. The inductive coupling factor can then be calibrated/controlled by the coupling-factor matching means 64 from $K=D_c/D_i*K_c$ so that $K_i*D_i=D_c*K_c$ is true at the adder 70 and subtractor 72.

Figure 2:
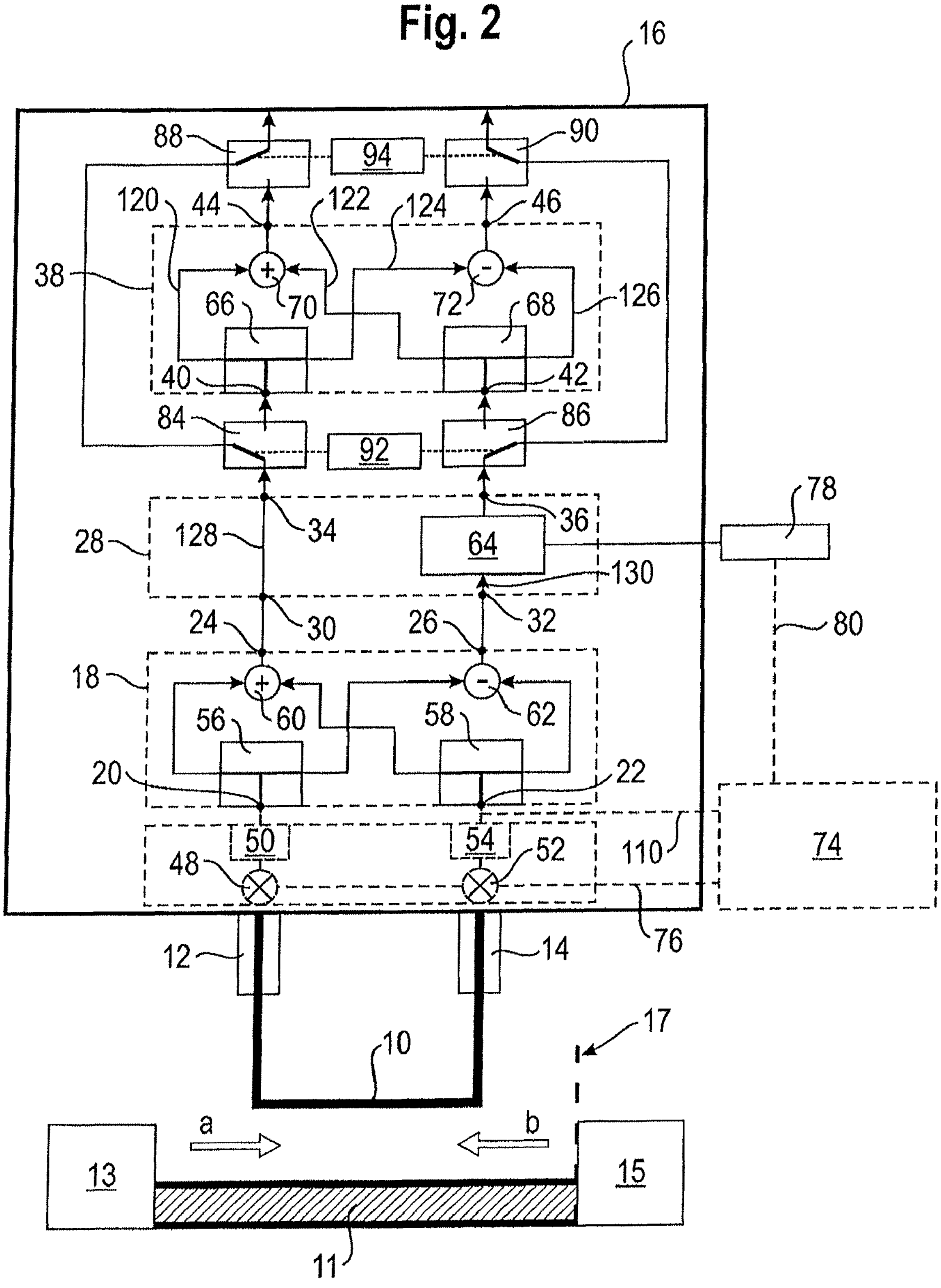
FIG. 2 is a schematic circuit diagram of a second preferred embodiment of loop-type directional coupler according to the invention.

In the second preferred embodiment of loop-type directional coupler according to the invention which is shown in FIG. 2, parts which perform the same function as in FIG. 1 are identified by the same reference numerals and reference should therefore be made to the above description of FIG. 1 for an explanation of them. In the second preferred embodiment shown in FIG. 2, two switches 84 and 86, which are for example electronic, are arranged in addition between the second network 28 and the third network 38 and two additional switches 88, 90 are provided above the third network 38, these pairs of switches being operated by respective control systems 92 and 94. The purpose of these latter is to enable the calibration described above relative to the reference plane 17 shown in the drawings to be carried out in a simplified way. The control at 78 of the second network 28 and of the switches 84, 86, 88, 90 is performed manually or as a completely automated process. In place of the switches 84, 86, 88, 90, use may also be made of two identical couplers.

For a very high directional effect to be achieved with an almost unlimited bandwidth, provision is made in a refinement of the invention which is a particular preference for the factor F, i.e. the settings, for each frequency point to be stored in a memory.

Figure 3:
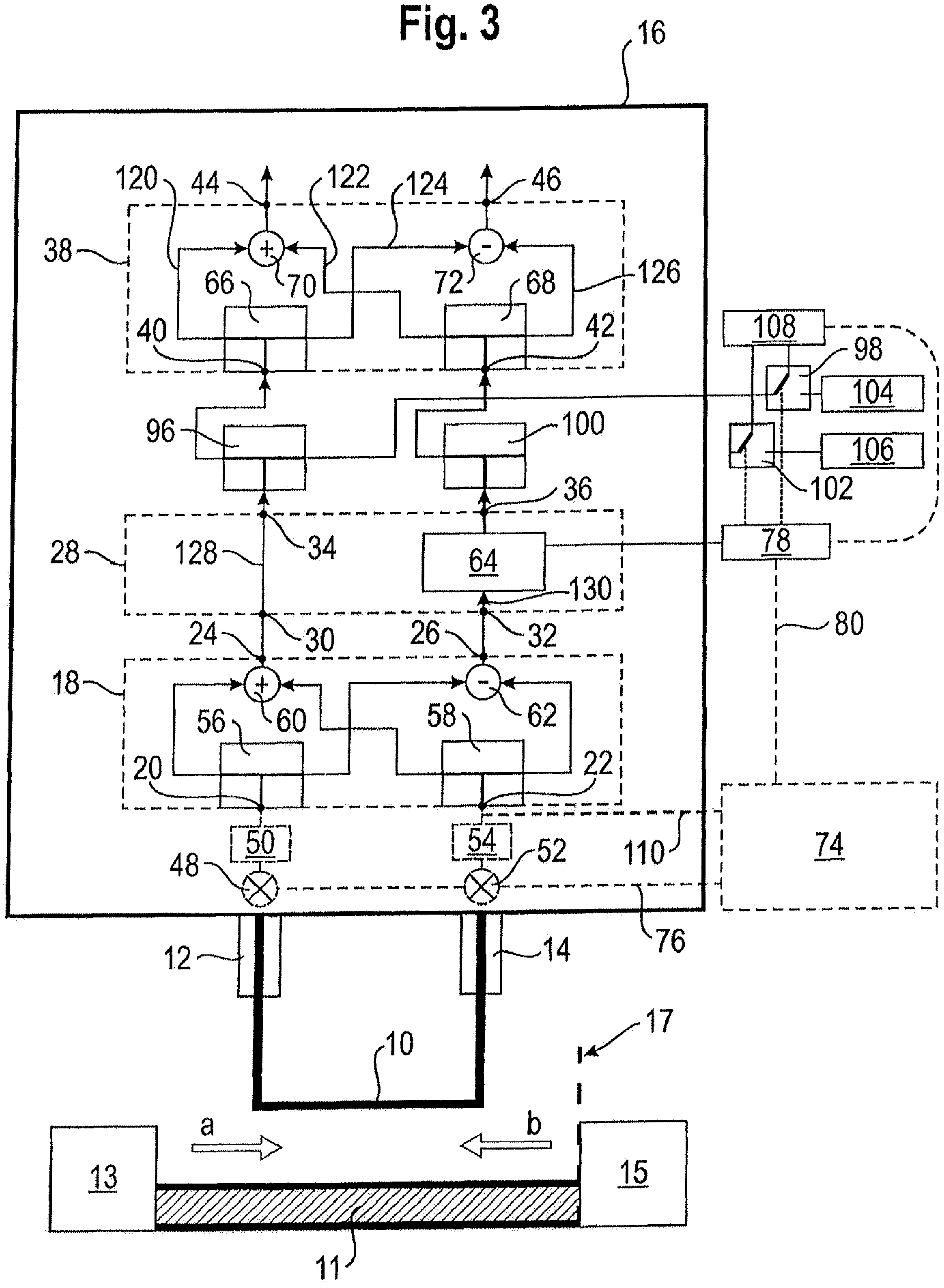
FIG. 3 is a schematic circuit diagram of a third preferred embodiment of loop-type directional coupler according to the invention.

In the third preferred embodiment of loop-type directional coupler according to the invention which is shown in FIG. 3, parts which perform the same function as in FIG. 1 are identified by the same reference numerals and reference should therefore be made to the above description of FIG. 1 for an explanation of them. In the third preferred embodiment shown in FIG. 3, there is arranged between the first output 34 of the second network 28 and the first input 40 of the third network 38 a fifth power divider 96 which feeds the signal to the first input 40 of the third network 38 and to a first switch 98. Between the second output 36 of the second network 28 and the second input 42 of the third network 38 is arranged a sixth power divider 100 which feeds the signal to the second input 42 of the third network 38 and to a second switch 102. The two switches 98, 102 feed the signal either to low-reflection terminations 104, 106 or to a receiver 108.

As dictated by the signals received at the time of calibration, the receiver 108 controls the control system 78 in such a way that the latter transmits to the second network 28 appropriate parameters for altering magnitude and phase, thus causing the coupling factors to be matched to one another by the coupling-factor matching means 64 in the way described above.

Figure 4:
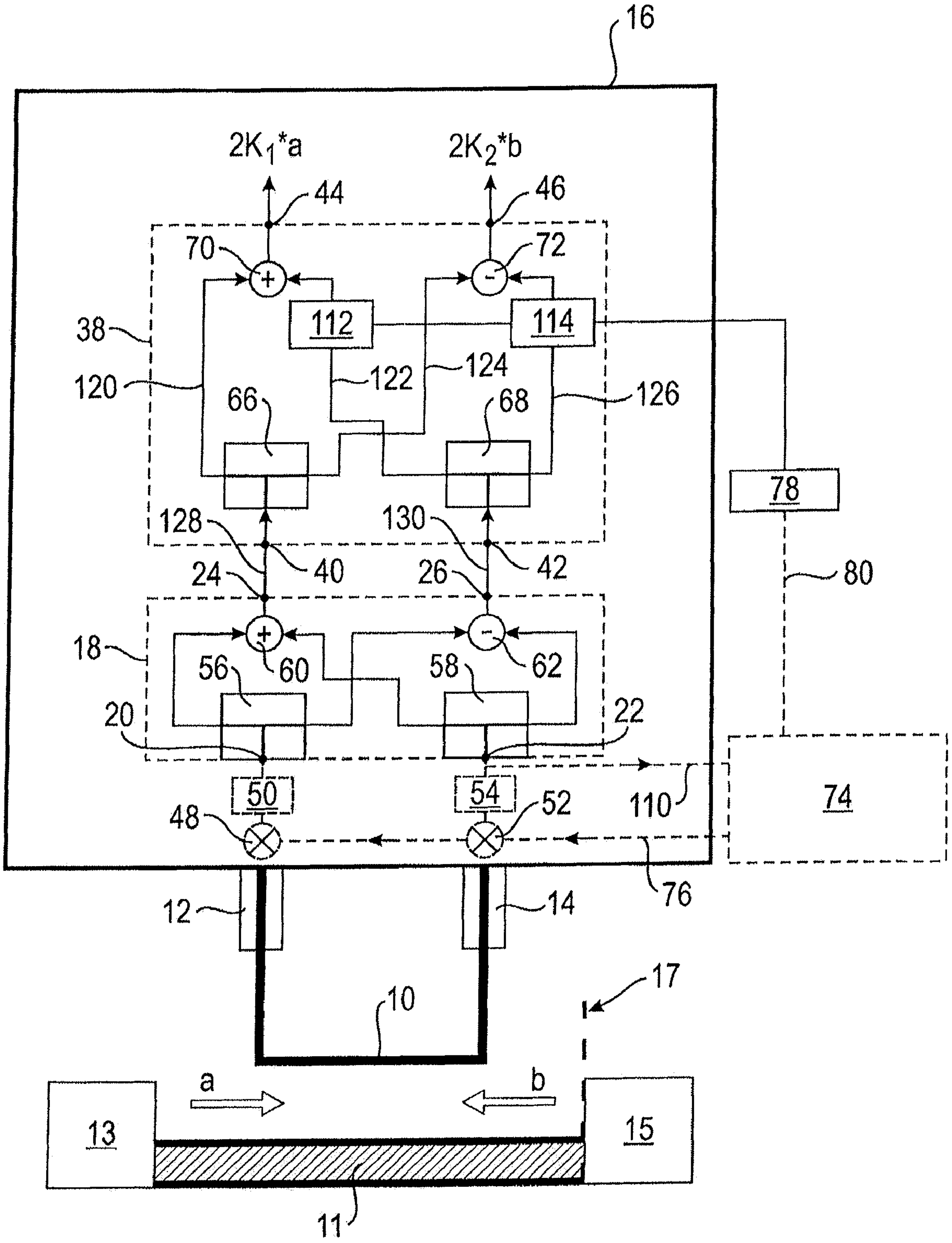
FIG. 4 is a schematic circuit diagram of a fourth preferred embodiment of loop-type directional coupler according to the invention.

Because it is not in fact possible for exactly identical signal paths 120, 122, 124, 126 to be produced particularly in the third network 38, the result is that the two coupling factors $K_i$ and $K_c*F$ may possibly no longer be identical at the adder 70 and subtractor 72 respectively. To deal with this problem in applications where the difference mentioned may be relevant, further coupling-factor matching means 112 and 114 are for example arranged immediately upstream of the adder 70 and subtractor 72 in the way shown in FIG. 4. In the fourth preferred embodiment which is shown in FIG. 4, parts which perform the same function as in FIGS. 1 to 3 are identified by the same reference numerals and reference should therefore be made to the above description of FIGS. 1 to 3 for an explanation of them. In contrast to the embodiments shown in FIGS. 1 to 3, a second network 28 is not provided and the signal paths 128 and 130 connect the first network 18 and the third network 38 together directly. The coupling-factor matching means 112 and 114 which are connected in immediately upstream of the adder 70 and subtractor 72 are responsible not only for correcting the attenuation and phase shift on the four paths in the third network but also, if required, for matching the coupling factors $K_i$ and $K_c$ which differ in magnitude and phase, in which case it is then possible to dispense with the coupling-factor matching means 64 in the first three embodiments shown in FIGS. 1 to 3, as is shown in FIG. 4. On one inductive path in the third network 38, the coupling-factor matching means 112 multiplies the coupling factor $K_i*D_2$ (coupling factor and transmission function) by a factor $F_4$ and on the other inductive path in the third network 38 the coupling-factor matching means 114 multiplies the coupling factor $K_i*D_4$ (coupling factor and transmission function) by a factor $F_4$. In this way, two signals to which the respective factors $K_c*D_i=K_1$ and $K_i*D_2*F_4=K_2$ apply are fed to the adder 70 for addition and two signals to which the respective factors $K_c*D_3=K_2$ and $K_i*D_4*F_6=K_2$ apply are fed to the subtractor 72 for subtraction. To separate the forward and backward waves "a", "b", it is enough for the coupling factors $K_1$ at respective ones of the two inputs of the second adder 70 and the coupling factors $K_2$ at respective ones of the two inputs of the second subtractor 72 to be identical, although the coupling factors $K_1$ and $K_2$ do not have to be identical in this case but may be so, i.e. $K=K_1=K_2$. The result is that $2*K_1*a$ is obtained at the first output 44 and $2*K_2*b$ is obtained at the output 46.

Because, as already mentioned, the paths in the third network 38 are not identical in practice, the value of directivity which can be achieved is minimised. The possible ways in which directivity can be maximised are as follows.

The transmission functions (attenuation and phase shift) $D_1$, $D_2$, $D_3$ and $D_4$ on the individual signal paths in the third network 38 or on the paths between the outputs 34, 36 of the second network 28 and the adder 70 and the subtractor 72 or between the outputs 24, 26 of the first network 18 and the adder 70 and the subtractor 72 are for example determined by measurement. Once they are known, the coupling factors are so adjusted by means of the second network 28 that the complex amplitudes of the signals are identical at each of the inputs of the adder 70 and subtractor 72, in which case the various configurations of the second network 28 which are described above are also possible. By way of example, only one coupling-factor matching means 64 is incorporated in the "inductive" path in each of the first three embodiments shown in FIGS. 1 to 3. Where $K=K_1=K_2$, what must be true of this configuration is:

$$K_c*D_1=K_i*F_2*D_2=K$$

$$K_c*D_3=K_i*F_2*D_4=K.$$

What therefore applies to the configuration of the second network 28 where the coupling-factor matching means is incorporated in the "capacitive" path is:

$$K_c*F_1*D_1=K_i*D_2=K$$

$$K_c*F_1*D_3=K_i*D_4=K.$$

If the coupling factors Ki, Kc are matched on both the paths (capacitive and inductive) in the second network 28, what applies is:

$$K_c*F_1*D_1=K_i*F_2*D_2=K$$

$$K_c*F_i*D_3=K_i*F_2*D_4=K.$$

The six equations given above can be satisfied if the following condition is met by the transmission paths: D1=D3 and D2=D4.

As described above, the setting of the factors $F_1$ and $F_2$ is performed by means of for example the configurations shown in FIGS. 2 and 3, with allowance being made in addition for the transmission factors $D_1$ to $D_4$. It is done as follows: firstly a low-reflection termination is used as the DUT. Then the two signal amplitudes ($K_c*F_1$, $K_i*F_2$) at the output of the second network 28 are measured in succession by means of a vectorial receiver or by means of the configurations shown in FIGS. 2 and 3. To set the correct coupling factor $F_1$ and/or $F_2$, the known transmission factors $D_1$, $D_2$ and $D_3$, $D_4$ respectively are downloaded from the memory and multiplied to give the received signals ($K_c*F_1*D_1$, $K_i*F_2*D_2$ or $K_c*F_1*D_3$, $K_i*F_2*D_4$). The factors $F_1$ and/or $F_2$ are then altered until such time as the amplitudes are identical:

$$K_c*D_1=K_i*F_2*D_2=K \text{ and } K_c*D_3=K_i*F_2*D_4=K \text{ respectively}$$

or $$K_c*F_1*D_1=K_i*D_2=K \text{ and } K_c*F_1*D_3=K_i*D_4=K \text{ respectively}$$

or $$K_c*F_1*D_1=K_1*F_2*D_2=K \text{ and } K_c*F_1*D_3=K_i*F_2*D_4=K \text{ respectively.}$$

If the condition $D_1=D_3$ and $D_2=D_4$ which applies to the transmission factors is not met, the two coupling-factor matching means 112, 114 are provided in the third network 38 rather than the coupling-factor matching means 64 being provided in the second network 28, as shown in FIG. 4. These coupling-factor matching means 112, 114 increase the directivity with due allowance for the attenuations $D_1$ to $D_4$ on the paths. Up to four coupling-factor matching means may be provided for all four of the paths in the third network 38. There are four configurations which may be considered in which either two coupling-factor matching means 112, 114 are used in the two capacitive or inductive paths, or four coupling-factor matching means are used, one in each path in the third network 38, or three coupling-factor matching means are used.

FIG. 4 shows a variant which has two coupling-factor matching means 112, 114 in the inductive ($K_i$) path. The coupling-factor matching means 112, 114 multiply the complex factors $F_3$, $F_4$, $F_5$ and/or $F_6$ to give the signal amplitudes. When a low-reflection DUT is used, the four signals upstream of the adder 70 and the subtractor 72 are so controlled/calibrated by a vectorial receiver, by means for example of switches or power dividers/couplers (in a similar way to what is done in FIGS. 2 and 3), that the output amplitudes are the same. When four coupling-factor matching means are used, the signals, prior to the addition and subtraction, work out as:

addition path 1: $K_c*D_1*F_3=K_1$, addition path 2: $K_i*D_2*F_4=K_1$

Subtraction path 1: $K_c*D_3*F_5=K_2$, subtraction path 2: $K_i*D_4*F_6=K_2$.

When three coupling-factor matching means are used and depending on which three paths the three coupling-factor matching means are arranged on, the signals prior to the addition and subtraction work out as:

addition path 1: $K_c*D_1*F_3=K_1$, addition path 2: $K_i*D_2*F_4=K_1$

Subtraction path 1: $K_c*D_3*F_5=K_2$, subtraction path 2: $K_i*D_4=K_2$ when a coupling-factor matching means is arranged in each of the first and second capacitive signal paths (120, 124) of the third network (38) and in its first inductive signal path (122), or addition path 1: $K_c*D_1*F_3=K_1$, addition path 2: $K_i*D_2*F_4=K_1$ subtraction path 1: $K_c*D_3=K_2$, subtraction path 2: $K_i*D_4*F_6=K_2$ when a coupling-factor matching means is arranged in each of the first and second capacitive signal paths (120, 124) of the third network (38) and in its second inductive signal path (126), or addition path 1: $K_c*D_1=K_1$, addition path 2: $K_i*D_2*F_4=K_1$ subtraction path 1: $K_c*D_3*F_5=K_2$, subtraction path 2: $K_i*D_4*F_6=K_2$ when a coupling-factor matching means (112, 114) is arranged in each of the first and second inductive signal paths (122, 126) of the third network (38) and in its second capacitive signal path (124), or addition path 1: $K_c*D_i*F_3=K_1$, addition path 2: $K_i*D_2*F_4=K_1$ subtraction path 1: $K_c*D_3=K_2$, subtraction path 2: $K_i*D_4*F_6=K_2$ when a coupling-factor matching means (112, 114) is arranged in each of the first and second inductive signal paths (122, 126) of the third network (38) and in its first capacitive signal path (120).

The result, for the configuration having two coupling-factor matching means 112, 114 in the inductive path as shown in FIG. 4, is:

$$K_c*D_1=K_i*F_4*D_2=K$$

$$K_c*D_3=K_i*F_6*D_4=K.$$

The embodiment shown in FIG. 4 can be expanded in a similar way to what is shown in FIGS. 2 and 3. The system shown in FIG. 4 may also have switches and/or power dividers, each of which is connected to a (vectorial) receiver by one output, provided for it between the coupling-factor matching means 112, 114 and the second adder 70 or second subtractor 72 for the calibration or determination of the factors $F_1$ to $F_4$.

In a further alternative embodiment, it is also possible for the network 16 to have both two, three or four coupling-factor matching means 112, 114 in the third network 38 and also one or two coupling-factor matching means 64 in the second network 28.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A loop-type directional coupler comprising a hollow, planar, or co-axial waveguide in the form of a half-loop antenna including a first arm and a second arm, for contactless coupling-out of a forward signal “a” and a backward signal “b” on said waveguide, including having the first arm connected to a first input of a first network and the second arm connected to a second input of the first network, the first network having a first power divider at the first input and a second power divider at the second input, dividing the respective signals applied to the arms of the antenna, the first network including a first adder which adds together the signals from the first and second power dividers and feeds the signal Kc(a+b) resulting from the addition, where Kc is a capacitive coupling factor of the loop-type directional coupler, to a first output of the first network, and a first subtractor which subtracts the signals from the first and second power dividers from one another and feeds the signal Ki(a−b) resulting from the subtraction, where Ki is an inductive coupling factor of the loop-type directional coupler, to a second output of the first network, and including a third network having a first input connected to the first output of the first network and having a second input connected to the second output of the first network, the third network including a third power divider at the first input and a fourth power divider at the second input, dividing the respective signals applied to the inputs of the third network, the third network including a second adder receiving the resultant signal from the third power divider via a first capacitive signal path having a complex transmission factor D1 and the resultant signal from the fourth power divider via a first inductive signal path having a complex transmission factor D2 and which adds these signals together and feeds the signal resulting from the addition to a first output of the third network, the third network including a second subtractor which receiving the signal from the third power divider via a second capacitive signal path having a complex transmission factor D3 and the signal from the fourth power divider via a second inductive signal path having a complex transmission factor D4 and which subtracts these signals from one another and feeds the signal resulting from the subtraction to a second output of the third network, there being arranged in at least one of the signal paths between the first and third networks or in at least one of the signal paths between the power dividers and the second adder and second subtractor, or both, at least one coupling-factor matcher which alters the magnitude or phase, or both magnitude and phase, of the signal on the given signal path in such a way that signals having coupling factors K1, K2 which are identical in respect of magnitude and phase are present for addition and subtraction at the second adder and second subtractor respectively.

2. The loop-type directional coupler of claim 1 including a second network comprising a first input connected to the first output of the first network, having a second input connected to the second output of the first network, a first output connected to a first input of a third network, and a second output connected to the second input of the third network, the second network including at least one coupling-factor matcher which alters the magnitude or phase, or both magnitude and phase, of the signal at the first input of the second network or at the second input of the second network, or both, in such a way that signals having coupling factors K1, K2 which are identical in respect of magnitude and phase are present for addition and subtraction at the second adder and second subtractor, respectively.

3. The loop type directional coupler of claim 2 further including having K1=K2=K and the at least one coupling-factor matcher multiplying the signal at the first input of the second network by a first complex factor F1 or the signal at the second input of the second network by a second complex factor F2, or both, wherein the first and second complex factors F1, F2 being selected in such a way that following is true:

$$K=Kc\cdot F1\cdot D1=Ki\cdot F2\cdot D2=Kc\cdot F1\cdot D3=Ki\cdot F2\cdot D4$$

or $$K=Kc\cdot F1\cdot D1=Ki\cdot D2=Kc\cdot F1D3=Ki\cdot D4$$

or $$K=Kc\cdot D1=Ki\cdot F2\cdot D2=Kc\cdot D3=Ki\cdot F2\cdot D4.$$

4. The loop-type directional coupler of claim 3 including a first changeover switch between the first output of the second network and the first input of the third network, and a second changeover switch between the second output of the second network and the second input of the third network, said changeover switches either apply the signals coming from the first and second outputs of the second network to the first and second inputs respectively of the third network or transmit said signals onwards while bypassing the third network.

5. The loop-type directional coupler of claim 2 including a first changeover switch between the first output of the second network and the first input of the third network, and a second changeover switch between the second output of the second network and the second input of the third network, said changeover switches either apply the signals coming from the first and second outputs of the second network to the first and second inputs respectively of the third network or transmit said signals onwards while bypassing the third network.

6. The loop-type directional coupler of claim 2 including having arranged between the first output of the second network and the first input of the third network a fifth power divider which applies the signal coming from the first output of the second network to the first input of the third network and to a third changeover switch, and further including having arranged between the second output of the second network and the second input of the third network a sixth power divider which applies the signal coming from the second output of the second network to the second input of the third network and to a fourth changeover switch, the changeover switches being so arranged and formed to feed the signals coming from the power dividers either to a receiver or to a terminating resistor.

7. The loop-type directional coupler of claim 6 including having the receiver connected to the control system for controlling the coupling-factor matchers.

8. The loop-type directional coupler of claim 2 including having arranged between the first output of the second network and the first input of the third network a fifth power divider which applies the signal coming from the first output of the second network to the first input of the third network and to a third changeover switch, and further including having arranged between the second output of the second network and the second input of the third network a sixth power divider which applies the signal coming from the second output of the second network to the second input of the third network and to a fourth changeover switch, the changeover switches being so arranged and formed to feed the signals coming from the power dividers either to a receiver or to a terminating resistor.

9. The loop-type directional coupler of claim 1 including coupling-factor matchers arranged in each of the first and second capacitive signal paths or the first and second inductive signal paths, or both, the coupling-factor matcher in the first capacitive signal path multiplying the signal by a complex factor F3, the coupling-factor matcher in the first inductive signal path multiplying the signal by a complex factor F4, the coupling-factor matcher in the second capacitive signal path multiplying the signal by a complex factor F5, and the coupling-factor matcher in the second inductive signal path multiplying the signal by a complex factor F6, the complex factors F3, F4, F5 and F6 being selected in such a way that the following are true:

$$Kc*D1*F3=Ki*F4*D2=K1$$

and $$Kc*D3*F5=Ki*F6*D4=K2$$

when a coupling-factor matcher is arranged in all the signal paths of the third network, or $$Kc*D1=Ki*F4*D2=K1$$

and $$Kc*D3=Ki*F6*D4=K2$$

when a coupling-factor matcher is arranged only in each of the first and second inductive signal paths of the third network, or $$Kc*D1*F3=Ki*F4*D2=K1$$

and $$Kc*D3*F5=Ki*D4=K2$$

when a coupling-factor matcher is arranged only in each of the first and second capacitive signal paths of the third network, or $$Kc*D1*F3=Ki*F4*D2=K1$$

and $$Kc*D3*F5=Ki*D4=K2$$

when a coupling-factor matcher is arranged in each of the first and second capacitive signal paths of the third network and in the first inductive signal path thereof, or $$Kc*D1*F3=Ki*F4*D2=K1$$

and $$Kc*D3=Ki*F6*D4=K2$$

when a coupling-factor matcher is arranged in each of the first and second capacitive signal paths of the third network and in the second inductive signal path thereof, or $$Kc*D1=Ki*F4*D2=K1$$

and $$Kc*D3*F5=Ki*F6*D4=K2$$

when a coupling-factor matcher is arranged in each of the first and second inductive signal paths of the third network and in the second capacitive signal path thereof, or $$Kc*D1*F3=Ki*F4*D2=K1$$

and $$Kc*D3=Ki*F6*D4=K2$$

when a coupling-factor matcher is arranged in each of the first and second inductive signal paths of the third network and in the first capacitive signal path thereof.

10. The loop-type directional coupler of claim 1 including having respective mixers and filters arranged between the first arm of the antenna and the first input of the first network and between the second arm of the antenna and the second input of the first network, the mixers and filters converting the signals coming from the arms of the antenna to a predetermined intermediate frequency.

11. The loop-type directional coupler of claim 10 including having the mixers connected to a variable frequency oscillator (VFO) which feeds a mixer signal for mixing with the signals coming from the arms of the antenna to the mixers.

12. The loop-type directional coupler of claim 11 including having the VFO connected to a control system controlling the coupling-factor matcher and setting a complex factor F, or complex factors F1, F2, F3, F4, F5 or F6, or any combination thereof, as a function of the mixer frequency fed to the mixers.

13. The loop-type directional coupler of claim 1 including having respective mixers and filters arranged between the first arm of the antenna and the first input of the first network and between the second arm of the antenna and the second input of the first network, the mixers and filters converting the signals coming from the arms of the antenna to a predetermined intermediate frequency.

14. The loop-type directional coupler of claim 13 including having the VFO comprise a phase-locked loop having a local oscillator and/or a reference oscillator.

15. The loop-type directional coupler of claim 14 including having the receiver connected to the control system for controlling the coupling-factor matcher.

16. The loop-type directional coupler of claim 13 including having the VFO connected to a control system controlling the coupling-factor matchers and setting a complex factor F, or complex factors F1, F2, F3, F4, F5 or F6, or any combination thereof, as a function of the mixer frequency fed to the mixers.

17. The loop-type directional coupler of claim 16 including having the receiver control the control system for controlling at least one of the coupling-factor matchers in such a way that said control system feeds to the coupling-factor matcher parameters such that the coupling-factor matcher alters the magnitude and/or phase or both magnitude and phase of the signal at the first input of the second network or at the second input of the second network, or both, in such a way that an identical coupling factor K exists at both the outputs of the second network.

18. The loop-type directional coupler of claim 16 including having the receiver control the control system for controlling at least one of the coupling-factor matchers in such a way that said control system feeds to the coupling-factor matcher parameters such that the coupling-factor matcher alters the magnitude or phase, or both magnitude and phase, of the signal at the first input of the second network or at the second input of the second network, or both, in such a way that a first coupling factor K1 exists at inputs of the second adder and a second coupling factor K2 exists at the inputs of the second subtractor.

19. The loop-type directional coupler claim 1 including a switch or a power divider connected to a vectorial receiver, provided between at least one coupling-factor matcher and the second adder or second subtractor, or upstream of at least one of the inputs of the second adder and the second subtractor.

* * * * *

UNITED STATES PATENT AND TRADEMARK OFFICE

CERTIFICATE OF CORRECTION

PATENT NO. : 8,121,574 B2
APPLICATION NO. : 12/670267
DATED : February 21, 2012
INVENTOR(S) : Thomas Zelder It is certified that error appears in the above-identified patent and that said Letters Patent is hereby corrected as shown below:

In the specification:

Col. 6, Line 12, delete "$K_c*D_i *F_3 = K_i*F_4*D_2=K_1$" and substitute therefore
-- $K_c*D_1*F_3 = K_i*F_4*D_2=K_1$ --

Col. 8, Line 4, delete "where K," and substitute therefore -- where $K_i$ --

Col. 12, Line 21, delete "$K_c * D_i = K_1$" and substitute therefore
-- $K_c * D_1 = K_1$ --

Col. 14, Line 22, delete "$K_c * D_i * F_3 = K_1$" and substitute therefore
-- $K_c * D_1 * F_3 = K_1$ --

In the claims:

Col. 15, Line 24, Claim 1, Delete "which"

Col. 15, Line 43, Claim 2, Delete "having"

Col. 15, Line 67, Delete "$K = K_c \cdot F_1 \cdot D_1 = K_i \cdot D_2 = K_c \cdot F_1 D_3 = K_i \cdot D_4$" and
Substitute therefore -- $K = K_c \cdot F_1 \cdot D_1 = K_i \cdot D_2 = K_c \cdot F_1 \cdot D_3 = K_i \cdot D_4$ --

Col. 17, Line 15, Claim 9, Delete "$K_c*D_i *F_3 = K_i*F_4*D_2= K_1$" and
Substitute therefore -- $K_c*D_1*F_3 = K_i*F_4*D_2= K_1$ --

Col. 18, Line 36, Claim 17, Delete "and/or" and Substitute therefore -- or --

Signed and Sealed this
Thirteenth Day of November, 2012

David J. Kappos

David J. Kappos
*Director of the United States Patent and Trademark Office*